United States Patent

[11] 3,524,432

| [72] | Inventor | Adolphe Tartar<br>139 Rue Jean Jaures, 62 Blendecques,<br>France |
|---|---|---|
| [21] | Appl. No. | 692,549 |
| [22] | Filed | Dec. 21, 1967 |
| [45] | Patented | Aug. 18, 1970 |

[54] FOOD DISPENSER FOR YOUNG ANIMALS
10 Claims, 3 Drawing Figs.

[52] U.S. Cl. .................................................. 119/51.11, 119/71
[51] Int. Cl. ..................................................... A01k9/00
[50] Field of Search............................................ 119/71, 51.5, 51.11

[56] References Cited
UNITED STATES PATENTS

| 3,307,521 | 3/1967 | Tavera et al. | 119/71 |
| 3,313,272 | 4/1967 | Moloney | 119/71X |
| 3,314,398 | 4/1967 | Legourd | 119/71 |
| 3,331,357 | 7/1967 | Legrain et al. | 119/71 |
| 3,425,398 | 2/1969 | Buffy et al. | 119/51.11 |

*Primary Examiner*— Hugh R. Chamblee
*Attorney*—Amster and Rothstein

ABSTRACT: Apparatus for dispensing artificial food for feeding young animals, characterized in that it comprises at least two teats to which access may be had respectively by animals divided into two groups requiring different feeding conditions, a movable shutter associated with each teat for preventing or permitting the access thereto according to the shutter positions and timing means for alternately opening and closing said teat-barring shutters, and a device responsive to said timing means and acting upon other means controlling the output of powdered food at the outlet of said storage hopper in order constantly to adjust the powdered food content of the dispensed mixture as a function of the particular one of said teats which is freely accessible to the animals.

Patented Aug. 18, 1970

FOOD DISPENSER FOR YOUNG ANIMALS

BACKGROUND OF THE INVENTION

This invention is concerned with improvements in or relating to dispensers of artificial food for feeding young animals, for example sucking calves.

At present food dispensing apparatus are known which are designed for dispensing compound foods such as powdered milk mixed with water, these apparatus being started automatically by the vacuum produced in the pipe line leading to a teat sucked by the young animal. As a rule, these apparatus incorporate a programmer controlling the delivery of heated water and powdered milk in pre-determined proportions, these ingredients being subsequently mixed by stirring means in a bowl from which the resulting liquid milk is sucked by the animals.

SUMMARY OF THE INVENTION

It is the essential object of this invention to provide an apparatus of the type broadly set forth hereinabove but capable of feeding rationally young animals pertaining to two different groups requiring different feeding conditions.

With this end in view, the apparatus according to this invention for dispensing artificial food for feeding young animals, which comprises a mixing vessel connected through pipe lines to teats disposed externally of the apparatus, a source of hot water and a hopper for storing food material, for example powdered milk, which supply hot water and powdered food respectively to said mixing vessel when a young animal sucks a teat, means for conveying the powdered food from said storage hopper to said mixing vessel, and means controlling the powdered-food output delivered by said storage hopper as a function of the powdered-food content of the food to be eventually dispensed to the animals, is characterized in that it comprises at least two teats to which access may be had respectively by animals divided into two groups requiring different feeding conditions, a movable shutter associated with each teat for preventing or permitting the access thereto according to the shutter positions, timing means for alternately opening and closing said teat-barring shutters, so that a shutter associated with one teat be open while the other shutter is closed and vice-versa, whereby only animals pertaining to one same group can feed themselves during a predetermined time period, and a device responsive to said timing means and acting upon other means controlling the output of powdered food at the outlet of said storage hopper in order constantly to adjust the powdered food content of the dispensed mixture as a function of the particular one of said teats which is freely accessible to the animals, that is, as a function of the group to which pertain the animals which can feed themselves at that time.

This invention is advantageous notably in that, by using a single dispensing apparatus, it facilitates the fattening of young animals, especially sucking calves, having different weights and divided into groups. A single apparatus according to this invention is also suitable for feeding on the one hand rearing or breeding calves gathered in one section of the cattle-shed and on the other hand butchery calves assembled in another section.

BRIEF DESCRIPTION OF THE DRAWINGS

In order to afford a clearer understanding of this invention and of the manner in which the same may be carried out in practice, various forms of embodiment thereof will now be described with reference to the attached drawings, in which.

DESCRIPTION OF THE PREFERRED EMBODIMENTS.

Figure 1:
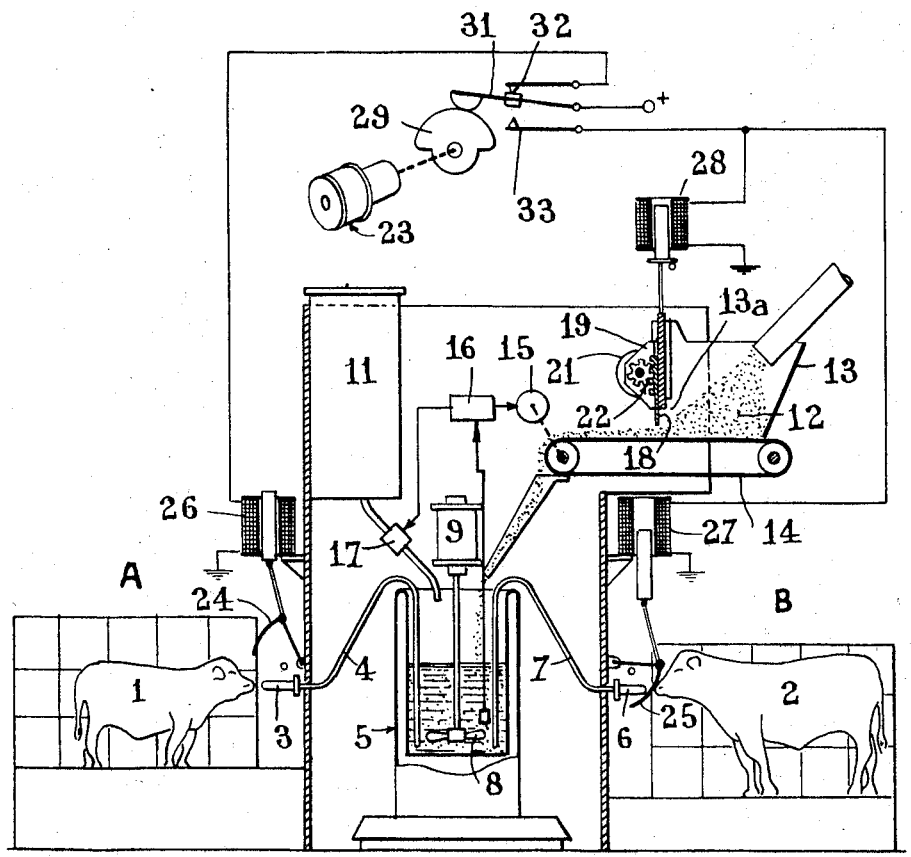
FIGURE 1 is a diagram illustrating the principle of a food dispensing apparatus constructed according to the teachings of this invention.

The apparatus illustrated in FIGURE 1 is erected in an enclosure or cattle-shed separated into two sections A and B in which animals divided into two groups 1 and 2 requiring different feeding conditions are gathered. These animals may be divided for example as a function of their weight. The apparatus according to this invention comprises one or more teats 3 adapted to be sucked by the animals 1, said teats being connected through a pipe line 4 to a mixing vessel 5. Similarly, this apparatus comprises one or a plurality of other teats 6 to which access can be had by the other animals 2 gathered in section B; these other teats 6 are also connected via a pipe line 7 to the same mixing vessel 5. This vessel 5 is equipped with a stirrer 8 driven from an electric motor 9. Hot water is supplied to the mixing vessel 5 from a suitable source 11 and with powdered-food material 12, for example powdered milk, contained in a storage hopper 13 and fed to the vessel 5 by means of a conveyor consisting for example of a rocking conveyor or, as illustrated in the FIGURE, of an endless belt 14 driven from an electric motor 15. A programmer 16 controls on the one hand the opening and closing of a valve 17 inserted in the pipe line connecting the hot water source 11 to the vessel and on the other hand the switching on and off of the motor 15 driving the endless belt conveyor 14.

The powdered milk content of the food dispensed to the sucking animal depends on the vertical position of an adjustment trap-door 18 closing more or less an outlet aperture 13a formed in the wall of the storage hopper 13 above the endless belt conveyor 14. This adjustment trap-door 18 is slidably mounted on a support 19, also movable vertically, and the position of trap-door 18 is adjustable in relation to said support 19 by means of a rotary knob 21 formed preferably with a vernier scale movable past a fixed index for controlling the sliding movement of trap-door 18 relative to said support 19 through a pinion-and-rack device 22.

According to this invention, the apparatus also comprises timing means 23 consisting in this example of a constantly rotating synchronous motor driving a reduction gearing. These timing means 23 control on the one hand movable shutters 24 and 25 associated with teats 3 and 6, respectively, and on the other hand the aforesaid adjustment trap-door 18. The actuation of these shutters 24, 25 and trap-door 18 from said timing means 23 may be effected either mechanically through a suitable linkage system, or electrically as shown in the drawing by way of example. In this last case the shutters 24 and 25 are actuated by electromagnets 26 and 27, respectively, and the support 19 of the adjustment trap-door 18 is responsive to another electromagnet 28. These various electromagnets are electrically controlled by means of a cam 29 rigid with the output shaft of the reducing gearing of timing means 23, this cam acting upon a follower 31 in the form of a movable contact blade 31 co-acting with a pair of fixed contact blades 32 and 33. Thus, by connecting the movable contact blade 31 to the positive terminal of a suitable source of current, as shown in the FIGURE, the upper fixed contact 32 is connected to one end of the winding of the electromagnet 26 of which the opposite end is grounded, and the other fixed contact 33 is connected on the one hand to one end of the winding of electromagnet 28 of which the opposite end is grounded, and on the other end to one end of the winding of the electromagnet 27 of which the other end is grounded.

The various movable elements of the above-described arrangement, i.e. the movable shutters 24 and 25, and the output adjustment trap-door 18, are normally urged to their lowermost positions against suitable stop means when none of the electromagnets 26, 27 and 28 is energized. The necessary downward force may be obtained either by gravity or by using suitable return springs.

The above-described apparatus operates as follows:

It will be assumed that at a predetermined time the cam 29 driven from the timing means 23 closes the contact between the movable blade 31 and the fixed contact 32, so that electromagnet 26 is energized while electromagnets 27 and 28 remain de-energized. Under these conditions, the energized electromagnet 26 will attract its plunger core to cause the upward movement of the movable shutter 24, so that the animals 1 have free access to teat 3. On the other hand, since the electromagnet 27 is de-energized, the other movable shutter 25 remains in its lower position and therefore the other animals 2 cannot feed themselves. Finally, since the last electromagnet 28 is de-energized, the trap-door support 19 remains in its lower position. Therefore, when an animal 1 sucks the teat 3 the liquid level in the mixing vessel 5 drops and when this level reaches a minimum threshold a level sensing device causes the apparatus to start, as described in the U.S. Pat. No. 3,037,481 to H. E. KLOSS, by energizing a programmer 16. In turn, this programmer 16 energizes during a predetermined time period the motor 15 driving the endless belt 14. Thus, a quantity of powdered milk adjusted as a function of the vertical position of trap-door 18 is released into the mixing vessel 5 and mixed therein with the hot water supplied from the source 11. Thus, the animal 1 will teat an artificial milk of relatively low powdered milk content.

Some time later, when the timing means 23 cause the cam 29 to rotate sufficiently to release the movable blade 31, the latter moves away from contact 32 and engages the other underlying fixed contact 33, whereby the previously energized electromagnet 26 becomes inoperative and the other electromagnets 27 and 28 become operative. As a consequence of the de-energization of electromagnet 26, the movable shutter 24 falls back to prevent any access to the teat 3 associated therewith. On the other hand, the now energized electromagnet 27 attracts its plunger core and therefore raises the movable shutter 25, thus permitting the access to the other teat 6 by the animals 2. At the same time, the now energized electromagnet 28 attracts its plunger core and raises the support 19 of trap-door 18. Under these conditions, this trap-door 18 is moved to a position higher than the preceding position so that when the animal 2 sucks the teat 6 and starts the operation of the apparatus, the quantity of powdered milk delivered to the mixing vessel 5 is greater than the previously delivered quantity. Therefore, the animal 2 will suck a richer artificial milk than animal 1.

From the foregoing it is clear that the animals 1 and 2 can feed alternatively during time periods set by the timing means 23 and that each animal receives an artificial food having a nutritive value corresponding or adapted to its feeding requirements.

According to a modified form of embodiment of this invention means are provided for varying the powdered milk output by controlling the time period during which the conveyor delivering the powdered milk to the mixing vessel 5 is operated, this conveyor consisting for example of an endless belt, a rocking conveyor, an Archimedean screw, etc. In this case, the timing means 23 may control the programmer 16 so that the latter energizes the driving means of said conveyor when the animals 1 in section A have free access to the corresponding teat 3, during a time shorter than that allowed when the other animals 2 have free access to their relevant teat 6. Under these conditions, the richness of the food dispensed to the animals 1 is lower than that of the food dispensed to the other animals 2.

The time during which the powdered milk conveyor is operative may be adjusted by using timing means comprising an adjustment control member disposed externally of the apparatus and movable along a graduated scale or the like. Thus, this graduated scale may display the quantity of powdered food material in grams per litre of water (or in oz. per gallon), and therefore the timing means associated therewith can also be used in case the apparatus were designed for feeding a single category of animals. Thus, the operator can easily alter at will, by adjusting the timer control member, the powdered-food content of the mixture dispensed to the animals.

Figure 2:
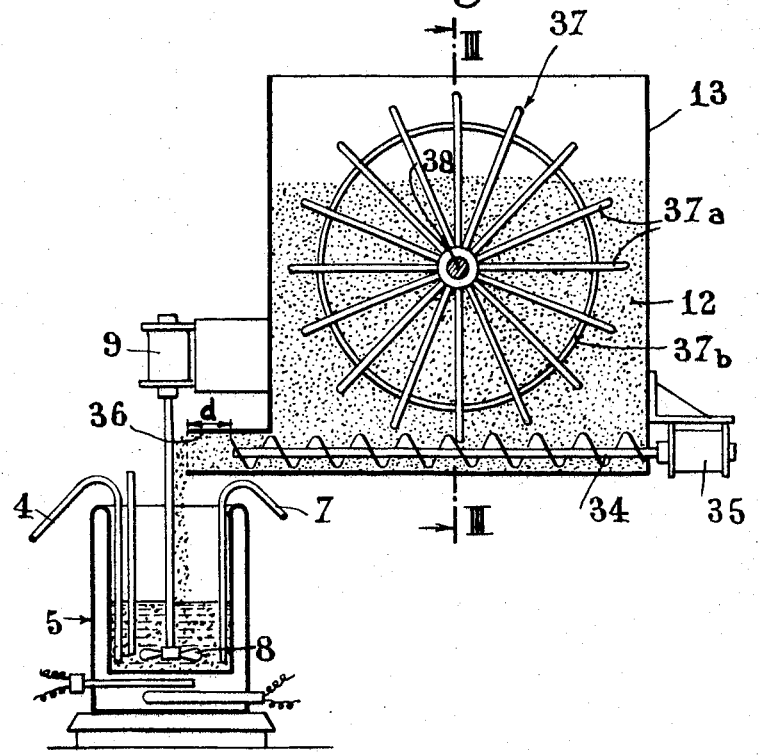
FIGURE 2 is a diagram showing a modified form of embodiment of the apparatus.
Figure 3:
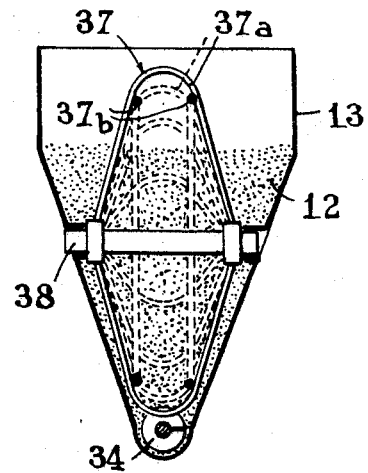
FIGURE 3 is a diagrammatic section taken along the line III-III of FIGURE 2.

In a modified form of embodiment of this invention which is shown in fragmentary and diagrammatic views in FIGURES 2 and 3, the powdered food conveyor consists of an Archimedean screw 34 mounted in the lower portion of the hopper 13 containing this powdered food. This Archimedean screw rotatably driven from a motor 35 delivers the powdered food at its outlet portion of hopper 13. The outlet end of the screw is somewhat spaced, as shown at d, from the free outlet aperture of duct 36, this distance d corresponding for example to one or two inches. The end of duct 36 overlies the mixing vessel 5.

Under these conditions, when the apparatus is operating and the motor 35 energized under the control of a programmer (not shown), the powdered food delivered by the Archimedean screw 34 fills continuously the outlet end of tubular duct 36 and the "plug" thus formed prevents any water steam rising from the mixing vessel 5 from entering the duct 36. As it breaks off, this plug provides a constantly renewed cross-sectional area adapted to absorb this water steam superficially.

On the other hand to facilitate the entrainment of the pulverulent product contained in the hopper 13 a metal paddle-wheel 37 carried by a shaft 38 rotatably mounted in suitable bearings housed in opposite lateral walls of the hopper 13 is provided within this hopper, as shown diagrammatically in FIGURES 2 and 3.

This wheel 37 is preferably constructed like a circular basket and comprises a number of radial bows 37a braced with one another by transverse rings 37b. The wheel 37 is so mounted that the central or outermost portions of these bows 37a engage the cavities separating the various turns of the Archimedean screw 34 from each other. Thus, the rotation of the Archimedean screw 34 about its axis is attended by a rotation of said wheel 37.

The above-described device positively prevents the formation of a vault of powdered product in the storage hopper 13. The variation in the powdered milk concentration of the amount of food taken at one suck is obtained, as already explained hereinabove, by using timing means controlling the time period during which the electric motor driving the Archimedean screw 34 is energized, and therefore the time during which the powdered food flows into the mixing vessel 5.

With this device the height from which the powdered product falls into the vessel 5 can be reduced considerably, thus avoiding any dispersion of this valuable product outside the vessel.

Of course, the various forms of embodiment of the invention which are described, illustrated and suggested herein should not be construed as limiting the scope of the invention since many modifications and variations can be brought thereto without departing from the spirit and scope of the invention as set forth in the appended claims.

I claim:

1. Apparatus for dispensing an artificial food for feeding young animals, comprising a mixing vessel connected through pipe lines to teats disposed externally of the apparatus, a source of hot water and a hopper for storing food-material, for example powdered milk, for supplying hot water and powdered food respectively to said mixing vessel, liquid sensing means in said mixing vessel controlling means for conveying the powdered food from said storage hopper to said mixing vessel and controlling a discharge means directing liquid from said source of hot water to said mixing vessel, and means controlling the powdered food output delivered by said storage hopper as a function of the powdered-food content of the food to be eventually dispensed to the animals, characterized in that it comprises at least two teats to which access may be had respectively by animals divided into two groups requiring different feeding conditions, movable shutters associated with said teats and controlling the access thereto according to their positions, timing means for alternatively opening and closing said shutters controlling the access to said teats so that one shutter associated with a teat be open while the other shutter is closed, and vice versa, whereby only the animals pertaining to a same group can feed themselves during a predetermined time period, and a device controlled by said timing means and acting upon means controlling the output of powdered-food material from the storage hopper in order constantly to adjust the powdered-food content as a function of the group of animals to feed, that is, as a function of the group to which pertain the animals which can feed themselves at that time.

2. Apparatus according to Claim 1, characterized in that the powdered-food content is controlled by means of an adjustable trap-door partially closing an outlet orifice of the hopper in which the powdered-food material is stored, and that the aforesaid timing means control the movement of said adjustable trap-door between two end positions in synchronism with the movement of said shutters controlling the access to said teats.

3. Apparatus according to Claim 2, characterized in that said adjustable trap-door is slidably mounted in a vertically movable support responsive to said timing means, a device being also provided for adjusting the vertical position of said trap-door in relation to its support.

4. Apparatus according to Claim 3, characterized in that the shutters controlling the access to said teats and the support of said adjustment trap-door are actuated by electromagnets adapted to be energized at proper times by means of a cam of said timing means which control contact means accordingly.

5. Apparatus according to Claim 3, characterized in that said shutters controlling the access to said teats and the support of said trap-door are actuated by means of linkages responsive to said timing means.

6. Apparatus according to Claim 1, comprising programming means responsive to said liquid level sensing means for controlling the time period during which the conveyor delivering the powdered-food material to the mixing vessel is operated, as a function of the group to which pertain the animals which can feed themselves at that time.

7. Apparatus according to Claim 1, characterized in that said conveyor consists of an Archimedean screw mounted in the lower portion of said hopper and rotatably driven from a motor, the output end of said screw revolving within a tubular duct projecting laterally from said lower portion of the hopper the outlet end of said duct overlying said mixing vessel.

8. Apparatus according to Claim 7, characterized in that the output end of said Archimedean screw is somewhat inwardly spaced from the outer end of said tubular duct overlying the mixing vessel, whereby a plug-forming body of pulverulent material constantly builds up in the outer end of said tubular duct.

9. Apparatus according to Claim 7, characterized in that a paddle-wheel is mounted for free rotation within said hopper and in meshing engagement with said Archimedean screw so as to be rotatably driven from said screw as a consequence of the movement of the helical turns thereof.

10. Apparatus according to Claim 9, characterized in that said wheel mounted within said hopper consists of a plurality of radial bows having their outer ends engaged in-between the turns of said Archimedean screw, said bows being braced by transverse ring members.